United States Patent [19]

O'Connor et al.

[11] Patent Number: 5,374,676
[45] Date of Patent: Dec. 20, 1994

[54] POLYURETHANE PREPARED FROM HYDROXYL-TERMINATED PREPOLYMER AND ANHYDRIDE WITH THERMOSETTING POLYESTER

[75] Inventors: James M. O'Connor, Clinton; Donald L. Lickei, Wallingford; Michael L. Rosin, Madison, all of Conn.

[73] Assignee: Ashland Oil, Inc., Ashland, Ky.

[21] Appl. No.: 179,763

[22] Filed: Jan. 10, 1994

Related U.S. Application Data

[63] Continuation of Ser. No. 17,946, Feb. 12, 1993, abandoned, which is a continuation of Ser. No. 564,662, Aug. 7, 1990, abandoned, which is a continuation of Ser. No. 63,200, Jun. 17, 1987, abandoned, which is a continuation of Ser. No. 499,656, May 31, 1983, abandoned, which is a continuation-in-part of Ser. No. 378,664, May 17, 1982, abandoned, which is a continuation-in-part of Ser. No. 298,854, Sep. 3, 1981, abandoned.

[51] Int. Cl.$^5$ .............................................. C08K 3/22
[52] U.S. Cl. .................................... 524/433; 524/404; 524/452; 524/539; 525/28
[58] Field of Search ................. 525/28, 440, 454, 455; 524/404, 452, 539

[56] References Cited

U.S. PATENT DOCUMENTS

| | | | |
|---|---|---|---|
| 3,218,274 | 11/1965 | Boller et al. | 528/297 |
| 3,419,510 | 12/1968 | Hudak | 524/109 |
| 3,962,369 | 6/1976 | Chang et al. | 525/518 |
| 4,413,072 | 11/1983 | Hess et al. | 523/500 |

FOREIGN PATENT DOCUMENTS

| | | |
|---|---|---|
| 47-19696 | 6/1972 | Japan . |
| 51-47089 | 4/1976 | Japan . |

*Primary Examiner*—Robert E. Sellers
*Attorney, Agent, or Firm*—Mueller and Smith

[57] ABSTRACT

The polyurethane oligomer reaction product of a hydroxyl-terminated prepolymer with a dicarboxylic acid anhydride is incorporated into conventional thermosetting polyester resin formulations to impart improved impact properties and reduced shrinkage behavior.

11 Claims, No Drawings

POLYURETHANE PREPARED FROM HYDROXYL-TERMINATED PREPOLYMER AND ANHYDRIDE WITH THERMOSETTING POLYESTER

This application is a continuation, of application Ser. No. 08/017,946, filed Feb. 12, 1993, now abandoned which is a continuation of copending application(s) Ser. No. 07/564,662 filed on Aug. 7, 1990, now abandoned, which is a continuation of application Ser. No. 063,200, filed Jun. 17, 1987, which is a continuation of Ser. No. 499,656 filed on May 31, 1983, now abandoned, which is a continuation-in-part of Ser. No. 378,664 filed on May 17, 1982, which is a continuation-in-part of Ser. No. 298,854 filed Sep. 3, 1981, now abandoned.

This invention relates to a thermosetting polyester resin composition; and, more particularly, to a thermosetting polyester resin composition which includes a select polyurethane oligomer to improve impact properties and surface characteristics.

In recent years, there has been a steady increase in the use of reinforced plastic materials for exterior components in automotive construction. Further increases in the utilization of plastics can be expected as automobile manufacturers continue to strive to meet vehicle weight reduction goals.

In the area of rigid plastic automotive components, fiberglass reinforced thermosetting polyester resins have been extensively employed. This can be attributed to their overall physical capabilities (e.g., dimensional stability, strength, high temperature resistance and paint adhesion). Other advantages include facility of handling and machining. However, these polyester systems still present certain deficiencies such as a brittle nature, which can lead to severe impact and fatigue problems. There is also a need to improve surface characteristics and shrinkage control.

To overcome these problems, various additives have been introduced into polyester sheet molding compounds (SMC) and bulk molding compounds (BMC). For example, in U.S. Pat. No. 4,020,036 issued to Aubrey South, Jr. on Apr. 26, 1977, liquid polymers, such as polybutadiene, are added in order to toughen polyester products. However, since these materials are not inherently compatible with polyester, these additives cannot be added to the polyester until it is time to mix the resin with the fiberglass. Saturated diacids or long-chain glycols also have been used in preparing polyester resins; the resulting products have been flexibilized, but, at the cost of lower mechanical and thermal properties.

Another approach involves the introduction of urethane systems into polyester resins. In U.S. Pat. No. 4,062,826 issued to Francis Gowland Hutchinson et al. on Dec. 13, 1977, precursors of a cross-linked polyurethane are polymerized within a mixture of ethylenically unsaturated polyester and vinyl monomer to form a product with an interpenetrating polyurethane gel network within the polyester cross-linked structure. While higher impact properties are reported to be achieved, the fine surface finish required for automotive body part applications is not accomplished. See Forger, G., *Toughened SMC*, Plastics World, page 63 (June 1978).

Thus, there is a need in the art for an improved additive for polyester resin systems which will impart high impact properties and low shrinkage characteristics.

Now, according to the invention, it has been discovered that these requirements can be achieved by incorporating a unique polyurethane oligomer system into a conventional thermosetting polyester resin formulation. In the practice of the invention, a molded plastic product is produced which features enhanced impact properties as well as low shrinkage to ensure satisfactory surface characteristics.

The polyurethane chemical system employed according to the present invention is formed by the reaction of a hydroxyl-terminated prepolymer with a dicarboxylic acid anhydride. Generally, the resulting oligomer of controlled molecular weight is readily miscible with polyester resins and hence does not present pre-mix incompatibility storage problems. When the polyurethane oligomer-polyester resin system is processed and molded, upon curing the molded product, the oligomer seems to phase out and form separate pockets or centers within the thermoset polyester matrix. The inclusion of the flexible polyurethane oligomer accomplishes a significant improvement in impact properties. Moreover, the unique behavior of the oligomer during polyester cure tends to relieve strain and thus prevent shrinkage and accompanying surface defects.

The polyurethane oligomer that is utilized according to the invention is prepared by first reacting an organic polyisocyanate with a polyol in an equivalent ratio of NCO/OH from about 0.3/1 to about 0.99/1, using standard procedures, to yield a hydroxyl-terminated prepolymer of controlled molecular weight. Preferably, the NCO/OH ratio ranges from about 0.60/1 to about 0.99/1. Common urethane catalysts, e.g., tertiary amines and metal compounds such as stannous octoate, dibutyltin dilaurate or dibutyl di (lauryl mercapto) tin, may be used to accelerate the reaction. In forming the prepolymer, other ingredients, such as chain extenders, well known to those in the polyurethane art, also may be included in the reaction mixture. These chain extenders include low molecular weight glycols such as ethylene glycol, 1,3-propylene glycol, 1,2-propylene glycol, butane diols, hexane diols, and the like. The reaction temperature and time will both depend upon many factors including the exact reactants being employed. In general, reaction temperatures from about 20° C. to about 110° C. and reaction times from about 0.5 hours to about 4.0 hours are preferred.

The polyol reactant used in the prepolymer formation includes polyether polyols and polyester polyols and mixtures of two or more such compounds. The polyol, or mixture of polyols, should have a number average molecular weight above about 1,000. Preferably, the number average molecular weight is about 1,500 to about 6,500, and more preferably about 2,000 to about 4,000. The average functionality of the polyol or polyol blend is usually about 1.5 to about 6.0, preferably about 2 to about 4, and more preferably about 2 to about 3.

Polyester polyols are the preferred polyol reactant. Any suitable polyester polyol may be used, including those derived from caprolactone and the products of reacting polycarboxylic acids with polyhydric alcohols, prepared in accordance with procedures well known in the art. Illustrative polycarboxylic acids include, for example, oxalic, malonic, succinic, glutaric, adipic, pimelic, suberic, azelaic, phthalic and isophthalic acids, mixtures thereof, and the like. Illustrative polyhydric alcohols include various diols, triols, tetrols and higher functionality alcohols, such as ethylene glycol, diethylene glycol, 1,3-propylene glycol, 1,2-propylene glycol, butylene glycols, butane diols, pentane diols, glycerol, trimethylolpropane, trimethylolhexane, hexane 1,2,6-triol, pentaerythritol, methyl glucoside, sorbitol, mixtures thereof, and the like. The preferred polyester polyols are the reaction products of polycarboxylic acids and polyhydric alcohols.

Any suitable polyether polyol may be used including various polyoxyalkylene polyols and mixtures thereof. These can be prepared, according to well-known methods, by condensing an alkylene oxide, or a mixture of alkylene oxides using random or step-wise addition, with a polyhydric initiator or a mixture of polyhydric initiators. Illustrative alkylene oxides include ethylene oxide, propylene oxide, butylene oxide, amylene oxide, tetrahydrofuran, aralkylene oxides such as styrene oxide, and the halogenated alkylene oxides such as trichlorobutylene oxide and so forth. The most preferred alkylene oxide is propylene oxide or a mixture thereof with ethylene oxide using random or step-wise oxalkylation.

The polyhydric initiator used in preparing the polyether polyol reactant includes the following and mixtures thereof: (a) the aliphatic diols such as ethylene glycol, diethylene glycol, 1,3-propylene glycol, 1,2-propylene glycol, butylene glycols, butane diols, pentane diols, and the like; (b) the aliphatic triols such as glycerol, trimethylolpropane, triethylolpropane, trimethylolhexane, and the like; (c) higher functionality alcohols such as pentaerythritol, methyl glucoside, sorbitol, and the like; (d) the polyamines such as tetraethylene diamine, and the like; and (e) the alkanolamines such as diethanolamine, triethanolamine, and the like. A preferred group of polyhydric initiators for use in preparing the polyether polyol reactant is one which comprises aliphatic diols and triols such as ethylene glycol, 1,2-propylene glycol, dipropylene glycol, glycerol, trimethylolpropane, and the like.

The alkylene oxide-polyhydric initiator condensation reaction is preferably carried out in the presence of a catalyst such as KOH as is well known in the art. In effecting the reaction, a sufficient proportion of alkylene oxide is used as to provide a final polyol product having a number average molecular weight of above about 1,000 to about 10,000, preferably about 1,500 to about 6,500, and more preferably about 2,000 to about 4,000. The catalyst is thereafter preferably removed, leaving a polyether polyol which is ready for use in preparing the hydroxyl-terminated prepolymer of the invention.

Any suitable organic polyisocyanate, or mixture of polyisocyanates, may be used in the polyurethane prepolymer formation including toluene diisocyanate, such as the 80:20 and the 65:35 mixtures of the 2,4- and 2,6-isomeric forms, ethylene diisocyanate, propylene diisocyanate, methylene-bis (4-phenyl isocyanate), methylene-bis (4-cyclohexyl) isocyanate, xylene diisocyanate, 3,3'-bitoluene-4,4'-diisocyanate, hexamethylene diisocyanate, naphthalene 1,5-diisocyanate, isophorone diisocyanate, the polymeric isocyanates such as polyphenylene polymethylene isocyanate, and the like, and mixtures thereof. In accordance with a particularly preferred embodiment of the invention, there is employed an isomeric mixture of 2,4- and 2,6-toluene diisocyanate in which the weight ratio of the 2,4-isomer to the 2,6-isomer is from about 60:40 to about 90:10, and more preferably, from about 65:35 to about 80:20.

To form the polyurethane oligomer that is utilized according to the invention, the prepared hydroxyl-terminated prepolymer, as defined above, is then reacted with an anhydride derived from a dicarboxylic acid. The reaction is carried out using methods well known in the art and employing such relative proportions of the reactants so as to achieve an oligomer product having a final free OH content preferably from about 0 to about 5 percent, and most preferably from about 0 to about 1 percent. Concurrently, however, the dicarboxylic acid anhydride is employed in a proportion such that the polyurethane oligomer has an acid number from about 0.1 to about 35, preferably from about 0.5 to about 25, and more preferably from about 1 to about 10. In accordance with practices known in the art, the "acid number" is calculated by first obtaining the ratio of the moles of dicarboxylic acid anhydride to the total weight in grams of organic polyisocyanate, polyol and dicarboxylic acid anhydride, then multiplying the result by 56,100.

Any suitable anhydride which is derived from an aliphatic or aromatic dicarboxylic acid may be used. The anhydride which is employed may be unsubstituted or it may be substituted with any of a variety of substituents, e.g., alkyl, halo, haloalkyl, cycloaliphatic, aryl, and the like. Illustrative dicarboxylic acid anhydrides include: aliphatic dicarboxylic acid anhydrides such as maleic anhydride, succinic anhydride, glutaric anhydride, citraconic anhydride, 2,3-dimethylmaleic anhydride, camphoric anhydride, cis-1,2-cyclohexane dicarboxylic anhydride, and the like; and aromatic dicarboxylic acid anhydrides such as phthalic anhydride, homophthalic anhydride, trimellitic anhydride, and the like. Preferred dicarboxylic acid anhydrides for use in the practice of the invention include unsubstituted and substituted maleic anhydrides, succinic anhydrides and glutaric anhydrides. Unsubstituted maleic anhydride, succinic anhydride and glutaric anhydride are the most preferred. By reaction of the hydroxyl-containing prepolymer with the dicarboxylic acid anhydride, a controlled molecular weight polyurethane oligomer with terminal carboxylic acid groups is produced.

Preferably, the reaction is carried out in the presence of a polymerizable solvent. Suitable polymerizable solvents include vinyl compounds, such as styrene, substituted styrenes (e.g., α-methylstyrene, chlorostyrene, etc.), vinyl toluene, divinyl benzene, esters of acrylic acid and methacrylic acid (e.g. methyl methacrylate, butyl acrylate, etc.), allyl esters (e.g. diallyl phthalate, diallyl fumerate, etc.), and the like, familiar to those skilled in the art. The amount of polymerizable solvent employed may be varied over a wide range. Generally, however, the polymerizable solvent is employed in an amount from about 0 to about 90 parts, and preferably from about 40 to about 70 parts, by weight per 100 parts by weight of the polyurethane oligomer plus polymerizable solvent. The reaction temperature and time will both depend upon many factors. For example, when the reaction is carried out in the presence of polymerizable solvent, a reaction temperature from about 40° C. to about 90° C. and a reaction time from about 0.5 hours to about 4.0 hours are preferred.

The described polyurethane oligomer is incorporated into thermosetting polyester resin formulations. These polyester resins include conventional polyesters as well as hybrid polyesters such as vinyl esters. The oligomer modifier additive can be used in any effective proportion. Preferably, the oligomer is added in a proportion ranging from about 4 to about 42 parts by weight per 100 parts by weight of polyester resin plus polymerizable solvent. Most preferably, the oligomer comprises from about 12 to about 35 parts by weight per 100 parts by weight of the polyester resin plus polymerizable solvent. The thermosetting polyester resins generally are prepared by reacting unsaturated acids or anhydrides or mixtures thereof with polyhydric alcohols or mixtures thereof, using methods and reactants well known to those skilled in the art of polyester technology. See, for example, Kirk-Othmer, *Encyclopedia of Chemical Technology*, Third Edition, Volume 18, pages 575–580 (1982), the entire disclosure of which is incorporated herein by reference. Typical reactants include maleic acid, fumaric acid, aconitic acid, mesaconic acid, maleic anhydride, itaconic anhydride, citraconic anhydride, mixtures thereof, and the like, and glycols, such as ethylene glycol, diethylene glycol, triethylene glycol, polyethylene glycol, propylene glycol, dipropylene glycol, polypropylene glycol, 1,3-butanediol, 1,4-butanediol, neopentyl glycol, cyclohexanedimethanol, 2, 2,4-trimethylpentanediol, bisphenol A, trimethylolethane, trimethylolpropane, dicyclopentadiene glycol, dibromoneopentyl glycol, mixtures thereof, and the like. Under some circumstances, the polyester resins may further contain, as co-condensed units, other compounds, such as dibasic aromatic acids and anhydrides and saturated aliphatic dibasic acids, which act as modifiers. Illustrative such compounds include phthalic anhydride, isophthalic acid, adipic acid, succinic acid, azelaic acid, sebacic acid, etc. as well as terephthalic acid, various hydrogenated phthalic anhydride derivatives, trimellitic anhydride, cyclohexanedicarboxylic acid, the anhydrides of chlorendic, tetrabromophthalic and tetrachlorophthalic acids, and so forth.

The polyurethane oligomer-containing polyester resin system is polymerized and cured in the presence of a heat activated, free radical generating catalyst. The actual curing conditions may vary over wide ranges and are generally dependent on the nature and amount of the particular catalyst employed. Suitable free radical generating catalysts include peroxide or azo type compounds, known to those in the art. Typical peroxide catalysts are illustrated by organo peroxides and hydroperoxides such as benzoyl peroxide, dicumyl peroxide, methyl ethyl ketone peroxide, lauryl peroxide, cyclohexanone peroxide, t-butyl perbenzoate, t-butyl hydroperoxide, t-butylbenzene hydroperoxide, cumene hydroperoxide, t-butyl peroctoate, and the like. Typical azo compounds are azobis-isobutyronitrile, 2-t-butylazo-2-cyano-4-methylpentane, and 4-t-butylazo-4-cyano-valeric acid. The preferred catalysts are peroxide catalysts. In particular, preferred peroxide catalysts are t-butyl peroctoate, t-butyl perbenzoate, and mixtures thereof. Any suitable catalytic amount may be employed; however, the catalyst generally is used in an amount from about 0.1 to about 10 parts by weight per 100 parts by weight of polyester resin, polyurethane oligomer and polymerizable solvent.

The composition of the present invention also contains a reinforcement material. Any suitable reinforcement material may be used, such as chopped fiberglass, carbon fibers, asbestos fibers, boron nitride whiskers, and the like. The amount of reinforcing agent added to the formulation may vary over a wide range. A typical formulation will generally contain from about 20 to about 400, and preferably from about 50 to about 200, parts by weight per 100 parts by weight of the polyester resin, polyurethane oligomer and polymerizable solvent.

Preferably, the composition also includes a filler. Any material known to those in the art as being suitable as a filler may be employed. Generally, a variety of materials, e.g., finely divided solids including $CaCO_3$, clay, alumina, talc, glass microspheres, and the like, may be utilized. The amount of filler generally included in the formulation may also vary considerably, but usually ranges from about 50 to about 500, and preferably from about 80 to about 250, parts by weight per 100 parts by weight of the polyester resin, polyurethane oligomer and polymerizable solvent.

The composition also may include other standard ingredients, if desired, such as internal mold release agents, e.g., calcium, zinc, magnesium, or sodium stearate. Other low shrink or impact additives also may be included, if desired. Pigments, dyes, stabilizers, thixotropes, wetting agents, viscosity modifiers (e.g., Group II metal oxides and hydroxides, such as magnesium oxide) and various other additives familiar to those skilled in thermosetting polyester technology also may be added.

The following examples are provided to furthest illustrate the invention. All parts are by weight unless otherwise specified.

EXAMPLE 1

Preparation of Polyurethane Oligomer

A. A 2-liter reaction flask equipped with stirrer, thermometer and addition funnel was charged with 261 grams (3.0 eq.) of diisocyanate ①. The diisocyanate was heated to 70° C., and 1,486.75 grams (1.5 eq.) of a polyether polyol ② were added via the additional funnel. After completion of the addition, the mixture was stirred for 3 hours at 80° C.

① This is a mixture of toluene diisocyanate isomers (80:20 mixture of 2,4/2,6-isomers).
② This is a triol having a number average molecular weight of about 3,000 and prepared by oxypropylating glycerin to a final hydroxyl number of about 56.6.

B. A 2-liter reaction flask equipped with stirrer, thermometer and addition funnel was charged with 164.9 grams (0.15 eq.) of the prepolymer prepared in A. The prepolymer was heated to 70° C., and 2.32 grams (0.02 eq.) of hydroxyethyl acrylate followed by 100 grams of styrene were added via the addition funnel. The resulting mixture was stirred at 70° C. for 3 hours. At that time 171.1 grams (0.16775 eq.) of a polyether polyol ③ followed by 413.1 grams of styrene were added. The reaction was catalyzed by the addition of 1.71 grams of a catalyst ④, and the reaction mixture was held at 70° C. for 3 hours. At that time 3.70 grams (0.03775 eq.) of maleic anhydride were added, and the mixture was stirred for 2 additional hours at 75°–80° C. The resulting material had a viscosity of 752 cps at 24° C. and a calculated acid number of 6.2.

③ This is a diol having a number average molecular weight of about 2,000 and prepared by oxypropylating dipropylene glycol to a final hydroxyl number of about 55.0.
④ This is dibutyl di (lauryl mercapto) tin and is a commercial product of Witco Chemical Corporation purchased under the designation "Fomrez UL-1".

EXAMPLE 2

A one-liter flask equipped with stirrer, thermometer and addition funnel was charged with a 8.0 grams (0.0079 eq.) of a polyether polyol ①, 27.65 grams of styrene, 16.38 grams (0.1882 eq.) of diisocyanate ② and 0.09 grams of a catalyst ③. The mixture was heated to 70° C., and stirred at 70° C. for 3 hours. The reaction mixture was cooled to room temperature, and 192 grams (0.2012 eq.) of a polyether polyol ④ followed by 300 grams of styrene were added. An additional 1.0 tion. Table I outlines the oligomer compositions prepared according to Examples 3–5.

TABLE I

| Example | Polyester Polyols (eq.) A① | B② | C③ | Styrene (grams) | Diisocyanate④ (eq.) | Catalyst⑤ (grams) | Maleic Anhydride (eq.) | Calculated Acid Number |
|---|---|---|---|---|---|---|---|---|
| 3 | 0.2587 | 0.0115 | — | 639.12 | 0.2297 | 2.12 | 0.0406 | 5.4 |
| 4 | 0.0800 | — | 0.0769 | 322.58 | 0.1255 | 1.07 | 0.0313 | 8.2 |
| 5 | 0.0667 | 0.0945 | — | 323.31 | 0.1208 | 1.07 | 0.0404 | 18.2 |

① This is a diethylene glycol adipate having a number average molecular weight of about 3,000 and a hydroxyl number of about 37.4. It is a commercial product of Hooker Chemical Corporation purchased under the designation "Rucoflex S-1011-35".
② This is a diethylene glycol adipate derived from glycerin and diethylene glycol and having a number average molecular weight of about 3,000 and a hydroxyl number of about 52.3. It is a commercial product of Hooker Chemical Corporation purchased under the designation "Rucoflex F-203".
③ This is a diethylene glycol adipated derived from glycerin and diethylene glycol and having a number average molecular weight of about 3,000 and a hydroxyl number of about 53.9. It is a commercial product of Hooker Chemical Corporation purchased under the designation "Rucoflex F-203".
④ This is a mixture of toluene diisocyanate isomers (80:20 mixture of 2,4/2,6-isomers).
⑤ This is a dibutyl di (lauryl mercapto) tin and is a commercial product of Witco Chemical Corporation purchased under the designation "Fomrez UL-1".

gram of catalyst ③ was added, and the mixture was reheated to 70° C. The reaction mixture was stirred at 70° C. for one hour. At that point 2.05 grams (0.0209 eq.) of maleic anhydride were added, and the mixture was stirred for an additional 2 hours at 70° C. The resulting material had a viscosity of 7,220 cps at 25° C and a calculated acid number of 5.4.
① This is a triol having a number average molecular weight of about 3,000 and prepared by oxypropylating glycerin to a final hydroxyl number of about 56.6.
② This is a mixture of toluene diisocyanate isomers (80:20 mixture of 2,4/2,6-isomers).
③ This is dibutyl di (lauryl mercapto) tin and is a commercial product of Witco Chemical Corporation purchased under the designation "Fomrez UL-1".
④ This is a polytetramethylene ether glycol having a molecular weight of about 2,000 and a hydroxyl number of about 58.8. It is a commercial product of The Quaker Oats Company purchased under the designation "Polymeg 2000".

EXAMPLE 3

A 2-liter reaction flask equipped with stirrer, thermometer and addition funnel was charged with 388 grams (0.2587 eq.) of a polyester polyol ①, 12.20 grams (0.0115 eq.) of a second polyester polyol ② and 439.12 grams of styrene. The mixture was heated to 60° C., and 19.98 grams (0.2297 eq.) of diisocyanate ③ followed by 200 grams of styrene were added. The reaction was catalyzed by the addition of 2.12 grams of a catalyst ④. The resulting mixture was stirred at 75°–80° C. for 2 hours, at which point 3.98 grams (0.0406 eq.) of maleic anhydride were added. The resulting mixture was stirred for 2 additional hours at 75°–80° C. The resulting material had a viscosity of 970 cps at 26° C. and a calculated acid number of 5.4.
① This is a diethylene glycol adipate having a number average molecular weight of about 3,000 and a hydroxyl number of about 37.4. It is a commercial product of Hooker Chemical Corporation purchased under the designation "Rucoflex S-1011-35".
② This is a diethylene glycol adipate derived from glycerin and diethylene glycol and having a number average molecular weight of about 3,000 and a hydroxyl number of about 52.3. It is a commercial product of Hooker Chemical Corporation purchased under the designation "Rucoflex F-203".
③ This is a mixture of toluene diisocyanate isomers (80:20 mixture of 2,4/2,6-isomers).
④ This is dibutyl di (lauryl mercapto) tin and is a commercial product of Witco Chemical Corporation purchased under the designation "Fomrez UL-1".

EXAMPLES 4 AND 5

Additional polyurethane oligomers were prepared employing the same reactants and conditions as outlined in Example 3. However, different proportions of reactants were used to form prepolymers. These prepolymers were reacted with suitable proportions of maleic anhydride to produce oligomers according to the invention. Table I outlines the oligomer compositions prepared according to Examples 3–5.

EXAMPLES 6–10

Polyester Molding

Thermoset polyester formulations were prepared containing polyurethane oligomers prepared according to Examples 1–5. The polyester molding formulation used is listed in Table II below. The following procedure was followed in the preparation of the cured composites.

a. Into a high shear mixing device were added the polyester resin and polyurethane oligomer.
b. The filler, thickener and catalyst were added and mixed until a homogeneous paste was achieved.
c. Next, chopped fiberglass was added gradually to the paste in a two-roll mill and the mix was worked the minimal length of time to achieve good wet out of the glass without significant breakdown.
d. The uncured mix was then placed in a mold between the platens of a compression molding machine and cured under pressure (1,000 psi) for three minutes at 300°–325° F.
e. Alternatively to (d), the mixture may be added by a hopper device to the screw system of an injection molding device to produce an injection molded part, or the mix may be made up on an SMC machine for later compression or injection molding.

The physical properties of panels prepared in this manner are included in Table III below. The physical properties were determined in accordance with standard test procedures: Flexural modulus and flexural strength—ASTM D790; tensile strength—ASTM D3574; and falling dart impact—ASTM D3029.

TABLE II

| POLYESTER MOLDING FORMULATION (BMC) | |
|---|---|
| Component | Parts By Weight |
| Polyester Resin① | 55 |
| Tertiary Butyl Peroxybenzoate | 0.67 |
| Tertiary Butyl Peroxyoctoate② | 0.33 |
| Calcium Carbonate | 160 |
| Magnesium oxide | 0.8 |
| ¼ Inch Glass | 112 |
| Polyurethane Oligomer | 18 |
| Styrene | 27 |

① Commercially available from Owens-Corning Fiberglass under the designation "P-340", understood as being derived from maleic anhydride and propylene glycol.
② Commercially available from Lupersol Co. under the designation "PDO", understood to consist of 50% tertiary butyl peroxyoctoate and 50% dioctyl phthalate.

COMPARATIVE EXAMPLE 1

A thermoset polyester resin was prepared following the procedure of Examples 6-10. The molding formulation employed was as follows:

| Component | Parts by Weight |
| --- | --- |
| Polyester Resin[1] | 65 |
| Tertiary Butyl Peroxybenzoate | 0.67 |
| Tertiary Butyl Peroxyoctoate[2] | 0.33 |
| Calcium Carbonate | 160 |
| Magnesium oxide | 0.8 |
| ⅛ Inch Glass | 112 |
| Low Shrink Additive[3] | 35 |

[1] Commercially available from Owens-Corning Fiberglass under the designation "P-340", understood as being derived from maleic anhydride and propylene glycol.
[2] Commercially available from Lupersol Co. under the designation "PDO", understood to consist of 50% tertiary butyl peroxyoctoate and 50% dioctyl phthalate.
[3] Commercially available from Owens-Corning Fiberglass under the designation "P-701".

The physical properties of the panel prepared in this manner are included in Table III below. The physical properties were determined in accordance with standard test procedures: Flexural modulus and flexural strength—ASTM D790; tensile strength—ASTM D3574; and falling dart impact—ASTM D3029.

TABLE III
PHYSICAL PROPERTIES OF COMPOSITES

| Example | Polyurethane Oligomer | Tensile Strength (psi) | Flexural Strength (psi) | Flexural Modulus × $10^6$ (psi) | Falling Dart Impact[1] (in-lb) | Surface[2] (1-5) |
| --- | --- | --- | --- | --- | --- | --- |
| 6 | Example 1 | 3400 | 9,900 | 1.1 | 53 | 2.0 |
| 7 | Example 2 | 5800 | 8,400 | 0.91 | 45 | 4.0 |
| 8 | Example 3 | 6000 | 10,900 | 1.0 | 56 | 5.0 |
| 9 | Example 4 | 5700 | 13,700 | 1.1 | 48 | 4.5 |
| 10 | Example 5 | 4100 | 11,400 | 1.2 | 53 | 3.5 |
| CE-1 | — | 8500 | 12,700 | 1.6 | 24 | 4.5 |

[1] Failure judged by the appearance of a crack one-eighth inch in length on the side opposite the impact.
[2] The surface is rated subjectively from 1-5, 5 having the smoothness of glass, while 1 is a fairly rough and uneven surface.

EXAMPLE 11

Preparation of Polyurethane Oligomer

A 10-gallon reactor was charged with 26780 grams of styrene, 876 grams (0.812 eq.) of a polyester polyol [1], 16103 grams (10.05 eq.) of a second polyester polyol [2] and 2.353 grams of hydroquinone. The contents of the reactor were mixed thoroughly for 20 minutes and 841.2 grams (9.67 eq.) of diisocyanate [3] followed by 89.9 grams of a catalyst [4] were added. The resulting mixture was heated to 70° C. and was mixed at 70°-75° C. for 1 hour, at which point 4.513 grams of hydroquinone and 167.5 grams (1.71 eq.) of maleic anhydride were added. This mixture was mixed at 70°-75° C. for 2 hours and then cooled to ambient temperature. A mixture of 2.355 grams of 4-tertiary butyl catechol and 4.51 grams of para-benzoquinone was then added and mixed in thoroughly. The oligomer had a calculated acid number of 5.3.

[1] This is a diethylene glycol adipate derived from glycerin and diethylene glycol and having a number average molecular weight of about 3,000 and a hydroxyl number of about 52. It is a commercial product of Hooker Chemical Corporation purchased under the designation "Rucoflex F-203".
[2] This is a diethylene glycol adipate having a number average molecular weight of about 3,000 and a hydroxyl number of about 35. It is a commercial product of Hooker Chemical Corporation purchased under the designation "Rucoflex S-1011-35".
[3] This is a mixture of toluene diisocyanate isomers (80:20 mixture of 2,4/2,6-isomers).
[4] This is a dibutyl di (lauryl mercapto) tin and is a commercial product of Witco Chemical Corporation purchased under the designation "Fomrez UL-1".

EXAMPLE 12

A five-liter reaction flask equipped with stirrer, thermometer and addition funnel was charged with 1358 grams (0.908 eq.) of a polyester polyol [1], 42 grams (0.040 eq.) of a second polyester polyol [2], 2026 grams of styrene, and 0.186 grams of hydroquinone. To this mixture were added 70.07 grams (0.805 eq.) of diisocyanate [3], 7.42 grams of a catalyst [4], and 200 grams of styrene. The mixture was heated to 75° C. and was stirred at 75° C. for 30 minutes. At this point, 0.372 grams of hydroquinone and 14.22 grams (0.142 eq.) of succinic anhydride were added. The resulting mixture was stirred at 75° C. for 2 hours, cooled to room temperature, and 0.372 grams of para-benzoquinone and 0.186 grams of 4-tertiary butyl catechol were added to the mixture. The oligomer had a viscosity of 945 cps at 26° C. and a calculated acid number of 5.3.

[1] This is a diethylene glycol adipate having a number average molecular weight of about 3,000 and a hydroxyl number of about 37.5. It is a commercial product of Hooker Chemical Corporation purchased under the designation "Rucoflex S-1011-35".
[2] This is a diethylene glycol adipate derived from glycerin and diethylene glycol and having a number average molecular weight of about 3,000 and a hydroxyl number of about 53.2. It is a commercial product of Hooker Chemical Corporation purchased under the designation "Rucoflex F-203".
[3] This is a mixture of toluene diisocyanate isomers (80:20 mixture of 2,4/2,6-isomers).
[4] This is dibutyl di (lauryl mercapto) tin and is a commercial product of Witco Chemical Corporation purchased under the designation "Fomrez UL-1".

EXAMPLE 13

A one-liter reaction flask equipped with stirrer, thermometer and addition funnel was charged with 194 grams (0.130 eq.) of a polyester polyol [1], 6 grams (0.006 eq.) of a second polyester polyol [2], 218 grams of styrene, and 0.027 grams of hydroquinone. To this mixture were added 10.01 grams (0.115 eq.) of diisocyanate [3], 70 grams of styrene, and 1.06 grams of a catalyst [4]. The mixture was heated to 75° C. and was stirred at 75° C. for 30 minutes. At this point 0.053 grams of hydroquinone and 2.27 grams (0.020 eq.) of citraconic anhydride were added. The resulting mixture was stirred at 75° C. for 2 hours and cooled to room temperature. To the cooled mixture were added 0.053 grams of para-benzoquinone and 0.027 grams of 4-tertiary butyl catechol. The resultant mixture had a viscosity of 960 cps at 28° C. and a calculated acid number of 5.3.

[1] This is a diethylene glycol adipate having a number average molecular weight of about 3,000 and a hydroxyl number of about 37.5. It is a commercial product of Hooker Chemical Corporation purchased under the designation "Rucoflex S-1011-35".
[2] This is a diethylene glycol adipate derived from glycerin and diethylene glycol and having a number average molecular weight of about 3,000 and a hydroxyl number of about 53.2. It is a commercial product of Hooker Chemical Corporation purchased under the designation "Rucoflex F-203".
(3) This is a mixture of toluene diisocyanate isomers (80:20 mixture of 2,4/2,6-isomers).
(4) This is dibutyl di (lauryl mercapto) tin and is a commercial product of Witco Chemical Corporation purchased under the designation "Fomrez UL-1".

EXAMPLES 14–16

Additional polyurethane oligomers were prepared employing the same reactants and conditions as outlined in Example 13, except that different dicarboxylic acid anhydrides were used as follows:

| Example No. | Dicarboxylic Acid Anhydride | Amount of Dicarboxylic Acid Anhydride (eq.) | Viscosity of Oligomer Product (cps) | Calculated Acid Number of Oligomer Product |
|---|---|---|---|---|
| 14 | Glutaric Anhydride | 0.020 | 820 (at 26° C.) | about 5–6 |
| 15 | Tetrahydrophthalic Anhydride | 0.020 | 970 (at 24° C.) | about 5–6 |
| 16 | Phthalic Anhydride | 0.020 | 870 (at 25° C.) | about 5–6 |

EXAMPLES 17–22

Polyester Molding

Thermoset polyester formulations were prepared containing polyurethane oligomers prepared according to Examples 11–16. The polyester molding formulation used is listed in Table IV below. The following procedure was followed in the preparation of the cured composites.

a. Into a high shear mixing device were added the polyester resin and polyurethane oligomer.
b. The filler, thickener and catalyst were added and mixed until a homogeneous paste was achieved.
c. Next, chopped fiberglass was added gradually to the paste and mixed in carefully by hand. The paste-fiberglass mixture was placed between two polyethylene sheets and was rolled flat with a rolling pin.
d. The uncured mix was stored between the polyethylene sheets for one day to allow maturation to take place.
e. The uncured mix was then placed in a mold between the platens of a compression molding machine and cured under pressure (1,000 psi) for three minutes at 300°–325° F.
f. Alternatively to (e), the mixture may be added by a hopper device to the screw system of an injection molding device to produce an injection molded part, or the mix may be made up on an SMC machine for later compression or injection molding.

The physical properties of panels prepared in this manner are included in Table IV below. The physical properties were determined in accordance with standard test procedures: Flexural modulus and flexural strength—ASTM D790; tensile strength—ASTM D3574; and falling dart impact—ASTM D3029.

TABLE IV

| POLYESTER MOLDING FORMULATION | |
|---|---|
| Component | Parts By Weight |
| Polyester Resin(1) | 65 |
| Tertiary Butyl Peroxybenzoate | 0.65 |
| Tertiary Butyl Peroxyoctoate(2) | 0.35 |
| Calcium Carbonate | 160 |
| Magnesium Oxide | 0.8 |
| ¼ Inch Glass | 112 |
| Polyurethane Oligomer | 14 |
| Styrene | 21 |

(1) Commercially available from Owens-Corning Fiberglass under the designation "P-340", understood as being derived from maleic anhydride and propylene glycol.
(2) Commercially available from Lupersol Co. under the designation "PDO", understood to consist of 50% tertiary butyl peroxyoctoate and 50% dioctyl phthalate.

Comparative Example 2

A thermoset polyester resin was prepared following the procedure of Examples 17–22. The molding formulation employed was as follows:

| Component | Parts by Weight |
|---|---|
| Polyester Resin(1) | 65 |
| Tertiary Butyl Peroxybenzoate | 0.67 |
| Tertiary Butyl Peroxyoctoate(2) | 0.33 |
| Calcium Carbonate | 160 |
| Magnesium Oxide | 0.8 |
| ¼ Inch Glass | 112 |
| Low Shrink Additive(3) | 35 |

(1) Commercially available from Owens-Corning Fiberglass under the designation "P-340", understood as being derived from maleic anhydride and propylene glycol.
(2) Commercially available from Lupersol Co. under the designation "PDO", understood to consist of 50% tertiary butyl peroxyoctoate and 50% dioctyl phthalate.
(3) Commercially available from Owens-Corning Fiberglass under the designation "P-701".

The physical properties of the panel prepared in this manner are included in Table V below. The physical properties were determined in accordance with standard test procedures: Flexural modulus and flexural strength—ASTM D790; tensile strength—ASTM D3574; and falling dart impact—ASTM D3029.

TABLE V

| PHYSICAL PROPERTIES OF COMPOSITES | | | | | | | | |
|---|---|---|---|---|---|---|---|---|
| | | | | | | | Dimensional Change(3) ($10^{-3}$ in/in) | |
| Example | Polyurethane Oligomer | Tensile Strength (psi) | Flexural Strength (psi) | Flexural Modulus × 10 (psi) | Falling Dart Impact(1) (in-lb) | Surface(2) (1–5) | Width-wise | Length-wise |
| 17 | 11 | 5820 | 14,500 | 1.55 | 8.4 | 3 | 0.25 | 0.45 |
| 18 | 12 | 6370 | 14,200 | 1.66 | 5.8 | 2.5 | 0.20 | 0.45 |
| 19 | 13 | 3880 | 7,600 | 1.23 | 7.0 | 2.5 | 0.20 | 0.35 |
| 20 | 14 | 6320 | 11,600 | 1,35 | 8.2 | 2.5 | 0.25 | 0.35 |
| 21 | 15 | 6440 | 15,900 | 1.64 | 6.8 | 3.0 | 0.30 | 0.40 |
| 22 | 16 | 6290 | 13,300 | 1.43 | 9.0 | 3.0 | 0.25 | 0.35 |

TABLE V-continued

PHYSICAL PROPERTIES OF COMPOSITES

| Example | Polyurethane Oligomer | Tensile Strength (psi) | Flexural Strength (psi) | Flexural Modulus × 10 (psi) | Falling Dart Impact[1] (in-lb) | Surface[2] (1-5) | Dimensional Change[3] ($10^{-3}$ in/in) Width-wise | Length-wise |
|---|---|---|---|---|---|---|---|---|
| CE-2 | — | 8120 | 16,200 | 1.90 | 7.0 | 2.0 | — | — |

[1] Failure determined by the first appearance of a crack on the side opposite the impact.
[2] The surface is rated subjectively from 1-5, 5 having the smoothness of glass, while 1 is a fairly rough and uneven surface.
[3] Dimensional change is determined for each example by first measuring an average length dimension and an average width dimension for the cured composite. An average length dimension and an average width dimension are also obtained for the cured panel of Comparative Example 2. The differences between the average lengths and average widths of each example, respectively, and Comparative Example 2 are reported in Table V as dimensional change in units of $10^{-3}$ in. per in. of panel. A positive value demonstrates less shrinkage in the example panel than in the panel of Comparative Example 2.

What is claimed is:

1. In a thermosetting polyester resin composition comprising a thermosetting polyester resin, a heat activated free radical generating catalyst, a magnesium oxide viscosity modifier and a reinforcing agent, the improvement comprising an effective proportion of a polyurethane oligomer, said polyurethane oligomer having a final free OH content of from above about 0 to about 5 percent and an acid number from a lower limit of about 1 to an upper limit of about 6.2 and being prepared by reacting in the presence of a polymerizable solvent
    (a) a hydroxyl-terminated prepolymer which is the reaction product of an organic polyisocyanate with a polyol having a number average molecular weight (Mn) of above about 1,000 up to about 6,500 and an equivalent ratio of NCO to OH ranging from about 0.3/1 to about 0.99/1 with
    (b) a dicarboxylic acid anhydride.

2. The thermosetting polyester resin composition of claim 1, wherein said polyol has a number average molecular weight of between about 1000 and 4000.

3. The thermosetting polyester resin composition of claim 2, wherein said polyol has a number average molecular weight of between about 2000 and 4000.

4. The thermosetting polyester resin composition of claim 1, wherein said polyol is a mixture of polyols.

5. The thermosetting polyester resin composition of claim 1, wherein said polyol has an average functionality of between about 1.5 and 6.

6. The thermosetting polyester resin composition of claim 5, wherein said polyol has an average functionality of between about 2 and 4.

7. The thermosetting polyester resin composition of claim 1, wherein said polyol is one or more of a polyester polyol or a polyether polyol.

8. The thermosetting polyester resin composition of claim 1, wherein said dicarboxylic acid anhydride is an aliphatic or aromatic dicarboxylic acid anhydride which may be substituted with one or more of alkyl, halo, haloalkyl, cycloaliphatic, or aryl groups.

9. The thermosetting polyester resin composition of claim 8, wherein said dicarboxylic acid anhydride is selected from the group consisting of maleic anhydride, succinic anhydride, glutaric anhydride, citraconic anhydride, 2,3-dimethyl maleic anhydride, camphoric anhydride, cis-1,2-cyclohexane dicarboxylic anhydride, phthalic anhydride other than homophthalic anhydride, homophthalic anhydride, and trimellitic anhydride.

10. The thermosetting polyester resin composition of claim 9, wherein said dicarboxylic acid anhydride is one or more of maleic anhydride, succinic anhydride, or glutaric anhydride.

11. The thermosetting polyester resin composition of claim 1, wherein said polyol is a polyester polyol or a polyether polyol having a number average molecular weight of between about 1500 and 4000, and said dicarboxylic acid anhydride is one or more of maleic anhydride, succinic anhydrides, or glutaric anhydrides.

* * * * *